(12) United States Patent
Meijer et al.

(10) Patent No.: US 7,661,096 B2
(45) Date of Patent: *Feb. 9, 2010

(54) INTERACTION WITH NESTED AND NON-NESTED STREAMS

(75) Inventors: Henricus Johannes Maria Meijer, Mercer Island, WA (US); David Schach, Redmond, WA (US); Avner Y. Aharoni, Seattle, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 413 days.

This patent is subject to a terminal disclaimer.

(21) Appl. No.: 11/045,705

(22) Filed: Jan. 28, 2005

(65) Prior Publication Data

US 2005/0183071 A1    Aug. 18, 2005

Related U.S. Application Data

(63) Continuation-in-part of application No. 10/778,793, filed on Feb. 13, 2004.

(51) Int. Cl.
*G06F 9/45* (2006.01)

(52) U.S. Cl. .................. 717/140; 717/141; 717/151

(58) Field of Classification Search ......... 717/136–140, 717/140–141, 150, 151, 159, 160, 108; 707/103, 707/104
See application file for complete search history.

(56) References Cited

U.S. PATENT DOCUMENTS 5,295,256 A * 3/1994 Bapat ........................ 717/137

(Continued)

OTHER PUBLICATIONS

Guido van Rossum, "Flattening Python Object", Nov. 17, 1994, download from internet, pp. 1-18.*

(Continued)

*Primary Examiner*—Anna Deng
(74) *Attorney, Agent, or Firm*—Workman Nydegger

(57) ABSTRACT

The subject invention pertains to systems and methods for iterating over or otherwise traversing a collection of objects or elements. More specifically, mechanisms are provided for handling both conventional non-nested streams such as enumeratables as well as nested streams. Nested streams provide a more efficient mechanism for traversing certain objects such as recursive generators. One problem with nested streams is that they need to be flattened or simplified. Techniques are provided herein to allow such streams to be flattened quickly and efficiently. Moreover, systems and methods are disclosed to preserve backward compatibility of optimized nested stream processing with conventional non-nested streams.

12 Claims, 15 Drawing Sheets

U.S. PATENT DOCUMENTS

| | | | | |
|---|---|---|---|---|
| 5,630,131 | A * | 5/1997 | Palevich et al. | 717/108 |
| 5,758,153 | A * | 5/1998 | Atsatt et al. | 707/103 R |
| 6,006,230 | A * | 12/1999 | Ludwig et al. | 707/10 |
| 6,311,327 | B1 * | 10/2001 | O'Brien et al. | 717/114 |
| 6,453,356 | B1 * | 9/2002 | Sheard et al. | 709/231 |
| 6,564,265 | B2 * | 5/2003 | Tillmann et al. | 709/246 |
| 7,150,004 | B2 * | 12/2006 | Russell et al. | 717/118 |
| 7,181,732 | B2 * | 2/2007 | Bak et al. | 717/140 |
| 7,225,201 | B1 * | 5/2007 | Milby | 707/103 R |
| 7,278,137 | B1 * | 10/2007 | Fuhler et al. | 717/153 |
| 7,322,045 | B2 * | 1/2008 | Kiddy | 726/26 |
| 2002/0095658 | A1 * | 7/2002 | Shulman et al. | 717/111 |
| 2002/0129344 | A1 * | 9/2002 | Chen et al. | 717/151 |
| 2003/0033039 | A1 * | 2/2003 | Gutberlet et al. | 700/97 |
| 2004/0015907 | A1 * | 1/2004 | Giel et al. | 717/141 |

OTHER PUBLICATIONS

Hertel et al. "Formalizing the safety of Java, the Java virtual machine, and Java card", Dec. 2001, ACM CSUR vol. 33, Issue 4, pp. 517-558.*

Fegaras et al. "Optimizing Object Queries Using an Effective Calculus", Dec. 2000, ACM, TODS vol. 25, Ussue 4, pp. 457-516.*

Ives et al. "An XML query engine for network-bound data"Dec. 13, 2002, Springer-Verlag New York, Inc, The VLDB Journal vol. 11, Issue 4, pp. 380-402.*

* cited by examiner

INTERACTION WITH NESTED AND NON-NESTED STREAMS

CROSS-REFERENCE TO RELATED APPLICATIONS

This application is a continuation-in-part of U.S. application Ser. No. 10/778,793 filed Dec. 13, 2004 entitled "Fast Flattening of Nested Streams," the entirety of which is incorporated herein by reference.

TECHNICAL FIELD

The subject invention relates generally to computers and more particularly toward programming languages and compilers.

BACKGROUND

Programming languages continue to evolve to facilitate specification by programmers as well as efficient execution. In the early days of computer languages, low-level machine code was prevalent. With machine code, a computer program or instructions comprising a computer program were written with machine languages or assembly languages and executed by hardware (e.g., microprocessor). These languages provided a means to control computing hardware efficiently but were very difficult for programmers to understand and develop sophisticated logic. Subsequently, languages were introduced that provided various layers of abstraction. Accordingly, programmers could write programs at a higher level with a higher-level source language, which could then be converted via a compiler or interpreter to the lower level machine language understood by the hardware. Further advances in programming have provided additional layers of abstraction to allow more advanced programming logic to be specified much quicker then ever before. However, these advances do not come without a processing cost.

Compilers and/or interpreters bear the burden of translating high-level logic into executable machine code. In general, compilers and/or interpreters are components that receive a program specified in a source programming language (e.g., C, C#, Visual Basic, Java . . . ) and convert the logic provided thereby to machine language executable by a hardware device. However, the conversion need not be done verbatim. In fact, conventional compilers can analyze the source code and generate or inject very efficient code. Programmers write code that sets forth a logical flow of operations that is intuitive and easy for humans to understand. Yet, such code, as written, is often inefficient for a computer to execute. Compilers can identify inefficiencies and improve program performance at the hardware level by eliminating unnecessary operations and/or rearranging the execution of instructions while still preserving the intended functionality. In this manner, programmers can create robust and efficient software programs.

One of the layers of abstraction provided by high level programming languages pertains to iterators and generators. Most programming languages support base types for collections of base elements (e.g., array of integers, string of characters) as well as user-defined types for arbitrary collections of elements (e.g., enumerations of elements) and more complex data structures such as trees, stacks, queues, and linked lists. A software construct (e.g., object) that represents a collection of elements often provides methods related to the collection including insertion, deletion, searching, sorting, and testing for collection membership. Iterators provide or encapsulate functionality for traversing or enumerating elements or items in a collection. In essence, iterators can be employed to access elements from collections (e.g., list, array, tree . . . ) one at a time. The iterator construct can thus be utilized to simplify the process of iterating over elements.

By way of example, suppose a class in a programming language wants to support iteration using a foreach loop construct. A programmer could specify the following:
List1 list1=. . . ;
Foreach (object obj in list1)
  {DoSomething(obj);}

Here, "List1" is a class for a collection of elements of type "object" and "list1" is an instantiation of the class "List1." A foreach loop is specified such that a routine DoSomething is executed on or iterated over each object in "list1." A compiler, such as a C# compiler, can expand the foreach code into the following code that uses a while loop construct.

```
Enumerator e = list1.GetEnumerator( );
While (e.MoveNext( )) {
    Object obj = e.Current;
    DoSomething(obj);
}
```

The List1 data structure on whose instance the iteration occurs must support the GetEnumerator( ) function (as well as the MoveNext Method and Current property) in order for the foreach loop to execute properly. The creator of the List1 data structure implements the GetEnumerator function, which returns an Enumerator object. The Enumerator object also implements the Current property (indicates the current object in the List1) and the MoveNext method (for moving the next object in the List1, if there is one). The object maintains its internal state to allow moving to the next item each time around the loop. This is a form of an internal state machine that keeps track of an iterator's position in the data structure.

These kinds of modifications to specified code are desirable as they vastly improve program execution performance.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described, the subject invention concerns systems and methods for interacting with nested and non-nested streams. In particular, systems and methods are provided for expeditious processing of nested streams. These nested streams are more efficient than conventional non-nested streams for various tasks including those involving recursive generators. Accordingly, systems are built to support these fast nesting streams. However, it is not practical or reasonable to force or assume that programmers and/or compilers will completely abandon conventional non-nested streams. In a multi-language environment, for example, it is important to be able to consume types and functions that are produced by a variety of different compilers. However, even in a single-language environment such as the Java Virtual Machine, programs need to be able to consume types and classes that are created by older versions of the same compiler or created in different ways. Hence, systems and methods are provided herein to support both the conventional non-nested streams and the new nested streams.

In accordance with one aspect of the invention, an adapter is provided that enables conventional non-nested streams such as enumerables or enumerators in C# to be supported in a system designed around new nested streams. For example, the adapter can utilize methods provided by the class defining the conventional streams to iterate and retrieve elements (e.g., via MoveNext( ), Current property . . . ). Furthermore, the adapter can produce nested stream state outputs such as StreamState.Value and StreamState.Done, rather the traditional output indicators.

In accordance with another aspect of the invention, the capabilities provided by the adapter can be incorporated into the state machine that provides for fast processing of nested streams. This is more efficient as it avoids an additional method call to an adapter. According to a particular aspect of the invention, the stream type is determined and based on that determination particular code segments are executed. For example, if the stream is a conventional non-nested stream, values or elements can be consumed immediately without have to allocate or instantiate a stack to deal with nesting. However, if the stream is a new nested stream, the stream can be consumed efficiently utilizing methods optimized for such streams.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

Figure 1:
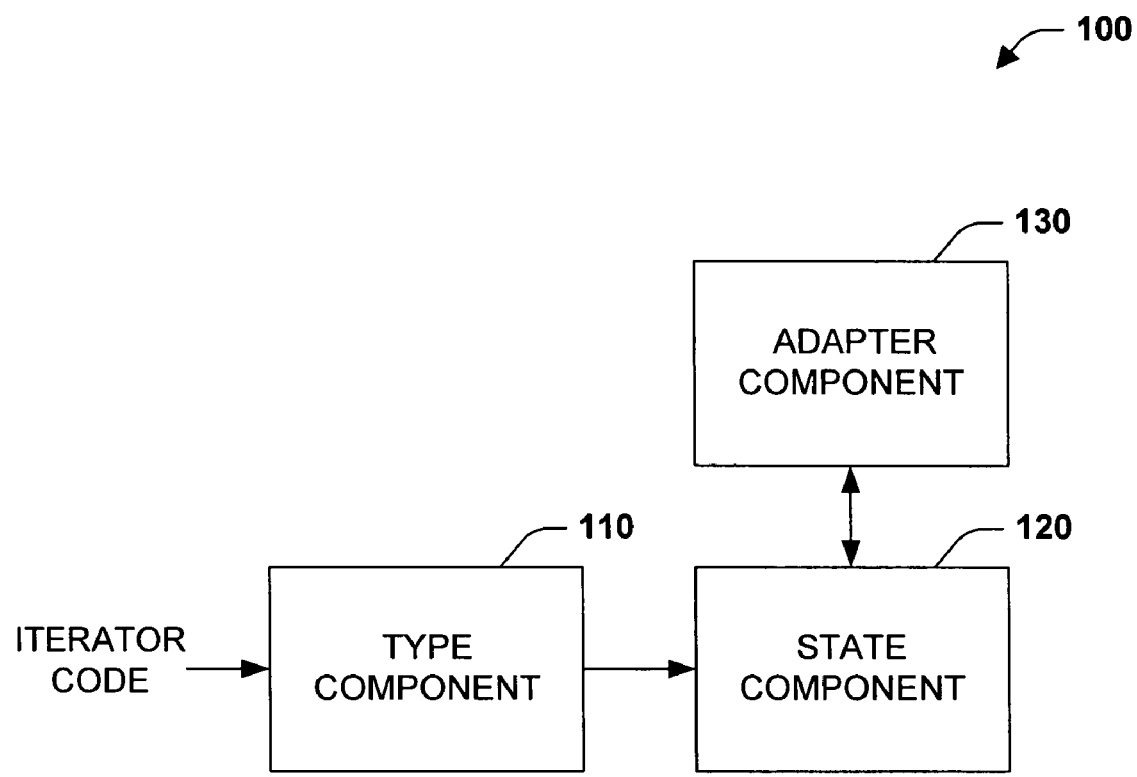
FIG. 1 is a block diagram of a compilation system in accordance with an aspect of the aspect of the subject invention.

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" (or alternatively, "computer program product") as used herein is intended to encompass a computer program accessible from any computer-readable device, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the subject invention.

Finally, solely for the sake of clarity in presentation and consistency many concepts and exemplary code fragments are presented in the C# programming language and discussed relevant to a C# compiler. For example, conventional non-nested streams are often referred to and discussed as being enumerables or enumerators, or of being implemented by IEnumerable or IEnumerator. This should not be interpreted as limiting the scope of the invention to such a programming language or specific implementation details. Upon reading this specification, those of skill in the art will appreciated that the presented systems, methods, techniques, and concepts can be applied to a myriad of different languages, compilers, and programmatic formats all for which are deemed to be within the scope of the subject invention.

Referring initially to FIG. 1, a compilation system 100 is illustrated in accordance with an aspect of the invention. Compilation system 100 can be employed as a sub-system within a compiler as described in further detail in a later section. In particular, compilation system 100 can be employed for generating efficient or optimized code for generators or more specifically for iterators. Iterators or iterator blocks are code segments (e.g., classes and the like) that yield or produce an ordered sequence of values, elements, or objects. For example, an iterator block can yield a sequence of strings, characters, integers, or user-defined objects. Often, iterators provide or encapsulate functionality for traversing or enumerating elements or items in a collection. In essence, iterators can be employed to access elements from collections (e.g., list, array, tree . . . ) one at a time. An iterator construct can thus be utilized to simplify the process of iterating over elements. Conventionally, an iterator can be distinguished from a normal statement block by the presence of one more yield statements (e.g., yield return, yield break, yield foreach . . . ). For example:

```
class Demo {
    string hello = . . . ;
    IEnumerable <string> HelloWorld (string bye)
    {
        string world = . . . ;
        yield return this.hello;   //instance field
        yield return world;        //local variable
        yield return bye;          //parameter
    }
}
```

Here, "IEnumerable<string>" indicates that a sequence or non-nested stream of strings will be returned. In particular, the sequence hello, world, bye will be yielded. Furthermore, in conventional programming languages including but not limited to C# an iterator is a means of implementing a function member whose return type is an enumerator interface (IEnumerator) or enumerable interface (IEnumerable). An ordered sequence of values is yielded by an iterator. This represents the old style or conventional iterators and streams, which are also referred to herein as simply enumerators or enumerables. According to one aspect of the invention, another type of sequence of values, items, or objects is presented called nested streams. Nested streams can include a sequence of one or more streams. In other words, a nested stream describes a stream within one or more other streams. For example, if a function that returns a stream repeatedly calls itself, the result of that recursive function will be streams of data within other streams. Conventional enumerators do not support nesting. Accordingly, they may be referred to as simply non-nested streams. As provided herein, an iterator or interator block can implement or extend type stream (including nested streams) or the old style enumerable and/or enumerator interfaces.

Compilation system 100 includes type component 110, state component 120 and adapter component 130. Type component 110 receives iterator code or blocks and identifies the type of collection implemented, extended or yielded by an iterator construct. As described above, this can be either a stream or enumerable. This information along with the iterator code can subsequently be communicated to the state component 120. Upon receipt or retrieval of iterator code, efficient compiler code can be generated by state component 120. More specifically, state component 120 can generate a state machine, inter alia, to enable efficient iteration or access of elements of a collection one at a time. The state machine can be implemented or represented at least in part by a programmatic switch statement or construct. The exemplary class Demo can be conceptually translated into the following class that implements IEnumerable<string> (ignoring accessibility modifies):

```
class Demo {
    string hello = . . . ;
    HelloWorldClosure HelloWorld(string bye)
    {
      return new HelloWorldClosure(this,bye);
    }
    class HelloWorldClosure: IEnumerable<string>
    {
    string bye;
    string world;
    Demo THIS;
    int PC=0;
    string __current;
    HellowWorldClosure (string bye, Demo THIS)
    {
    this.bye = bye; this.THIS = THIS;
    }
    string Current { get{ return __current; } }
    bool MoveNext( )
    {
        switch(PC)
        {
        case 0:
            string world = . . . ;
            // yield this.hello
            this.__current = this.THIS.hello;
            this.PC = 1;
            return true;
        case 1:
            // yield world;
            this.__current = this.world;
            this.PC = 2;
            return true;
        case 2:
            // yield bye;
            this.__current = this.bye;
            this.PC = -1;
            return true;
        default:
            return false;
        }
    }
    }
}
```

In the preceding code snippet, MoveNext method is the state machine generated for the HelloWorld method that returns a sequence of strings using yield statements. The MoveNext method can be in states zero, one, two or default. The method switches on PC, which is initialized to zero. In state zero, the first string is going to be returned. Subsequently, the state is set to one via the statement this.PC=1. The next time MoveNext is called, it is going to proceed to state one, where the second string world is going to be returned and the state set to two. When called again, the method will return the third string bye and set the state to negative one. The next time MoveNext is called it will proceed to default and false will be returned indicating that there is nothing left in the sequence. This is one example of how a conventional iterator would be complied. In general, the only thing that is known for certain is that the class implements IEnumerable and it has two methods MoveNext, which returns a Boolean indicating whether or not something is returned and Current which returns the current value.

However, the implementation of the state machine for streams that support nesting can be quite different. For example, in one implementation either a normal value, a nested stream (which can also be a tail-call) or an indication that the end of the stream has been reached is generated. Further, instead of IEnumerator<string>, the generated class extends a new abstract base class NestedEnumerable<T>. Rather than simply utilizing bool MoveNext, a method StreamState NestedMoveNext( ) is employed. The code for a normal yield return expression statement becomes:

```
this._currentValue = expr;    //where expr modified as before
this.PC = . . . ;
return StreamState.Value;
```

The code for returning a nested stream either via an explicit yield foreach expression or a yield return expression where expression is of a stream type becomes the following:
this._currentStream=expr; //where expr modified as before
this.PC=. . . ;
return StreamState.Stream;

Instead of returning false to signal termination, the end of the stream needs to be signaled:
return StreamState.Done The new abstract base class NestedEnumerable<T> (also referred to herein a Stream <T>) implements IEnumerable<T> and its MoveNext implements the state machine to flatten a nested stream of type Stream<T> into a normal stream using a stack. By way of example, consider the following code implementing a nested stream state machine:

```
public bool MoveNext( ) {
    StreamState r = ne.NestedMoveNext( );
    switch(result) {
        case StreamState.Value:
            return true;
        case StreamState.Stream:
            if(stack==null) stack = new Stack( );
            stack.Push(ne);
            ne = ne.currentStream;
            break;
        case StreamState.TailStream:
            ne = ne.currentStream;
            break;
        case StreamState.Done:
            if(stack != null && stack.Count > 0){
                ne = stack.Peek()_ as Stream; stack.Pop( );
                break;
            }
            return false;
    }
}
```

From the switch statement, it is clear that this MoveNext function assumes that it will be operating on a stream. It presupposes that a stream will be provided that needs to be flattened and that the collection will provide a NestedMoveNext( ) function. However, the switch statement does not allow and is not compatible with ordinary non-nested streams such as enumerables.

Adapter 130 enables use of conventional non-nested streams such as enumerables together with nested streams. Specifically, the state component 120 can include an additional state StreamState.Enumerable, which calls the adapter 130 to operate on an interator that implements IEnumerable rather than Stream. For example, the following case can be added to the MoveNext state machine for streams:
. . .
Case StreamState.Enumerable:
    if (stack==null) stack=new Stack( );
    stack.Push (ne);
    ne=new StreamAdapter<T>(ne.currentEnumerable);
    break;
. . .

As coded, the enumerable will be pushed on a stack just like a nested stream would be and a new StreamAdapter is instantiated to convert the enumerable into a stream or behave like a stream, thereby enabling utilization of both nested and non-nested streams.

Figure 2:
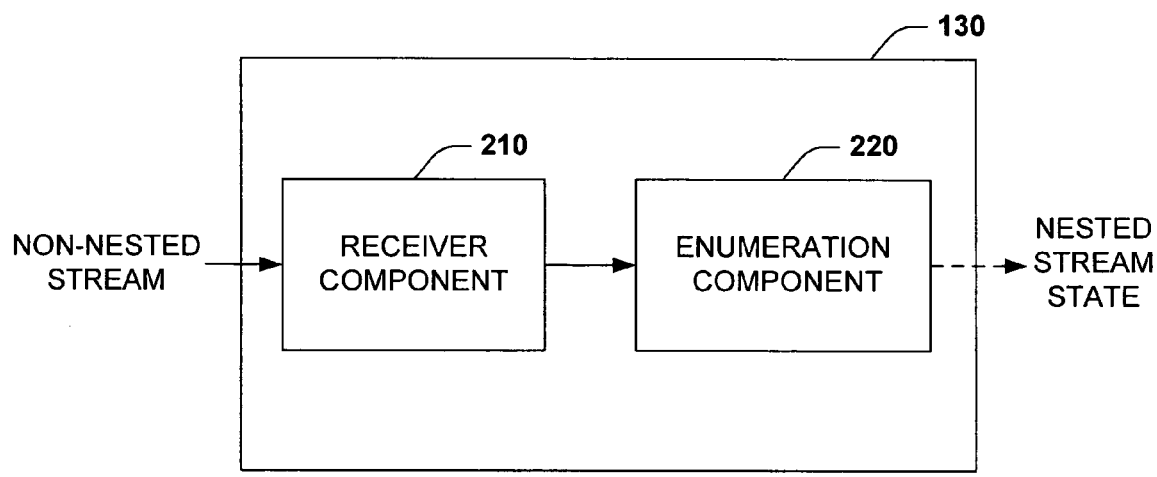
FIG. 2 is a block diagram of an adapter in accordance with an aspect of the subject invention.

FIG. 2 illustrates an adapter 130 in further detail in accordance an aspect of the subject invention. Adapter 130 can include a receiver component 210 and an enumeration component 220. Receiver component 210 can receive a non-nested stream or enumerable or a pointer thereto. Enumeration component 220 receives or retrieves the enumerable from the receiver component and provides functionality to enable enumeration or iteration of an enumerable and retrieval of values or elements from the enumerable collection. According to one aspect of the invention, the adapter can provide a NestedMoveNext function for enumerables. Rather than returning a Boolean true or false to indicate whether a value has been retrieved or not, the adapter can return StreamState.Value or StreamState.Done. In this manner, enumerables can appear as a stream, which enables them to be easily plugged into the function in conjunction with the functionality provided for nested streams. Consider the following exemplary code for an implementing an adapter for an enumerable:

```
public abstract class StreamAdapter<T> : Stream<T> {
    private IEnumerator e;
    StreamAdapter(IEnumerable ie){ e = ie.GetEnumerator( ); }
    public StreamState NestedMoveNext( ) {
        if (e.MoveNext( )) {
            ne.currentValue = e.Current;
            return StreamState.Value;
        }
        return StreamState.Done;
    }
}
```

Alternatively, upon receipt of a non-nested enumerable the enumeration component 220 could proceed to iterate through and pull all the values from the enumerable collection. This allows enumerables to be processed more efficiently. Because enumerables are not nested, there is no real need to force processing thereof to proceed as if they were nested streams. Accordingly, values can simply be retrieved from enumerables in a more efficient manner will preserving more complex processing for nested streams. For example:

```
while (e.MoveNext( )) {
    ne.currentValue = e.Current;
}
```

In view of the exemplary systems described supra, methodologies that may be implemented in accordance with the present invention will be better appreciated with reference to the flow charts of FIGS. 3-13. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, or media.

Figure 3:
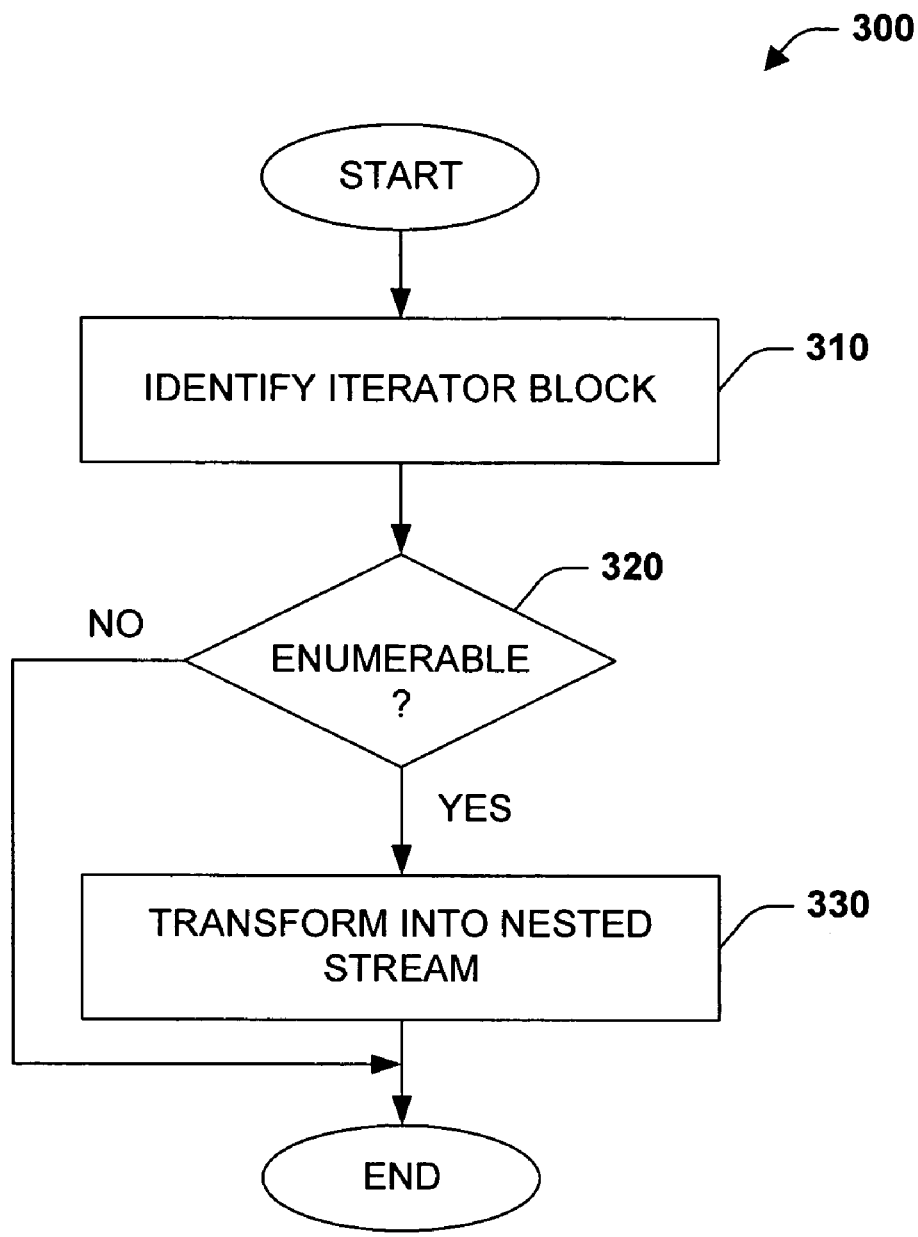
FIG. 3 is a flow chart diagram illustrating a compilation methodology in accordance with an aspect of the present invention.

Turning to FIG. 3, a compilation methodology 300 is provided in accordance with an aspect of the invention. This methodology 300 can be employed by a compiler to enable interaction between non-nested streams such as enumerables and nested streams. At 310, an iterator block is identified. An iterator block can be differentiated from other statements by the presence of one or more yield statements (e.g., yield return, yield break, yield foreach . . . ). At 320, a determination is made concerning whether the block returns or implements enumerable more specifically the interface IEnumerable. If it does not, then the method simply terminates. If the iterator block does return IEnumerable, for example, then the iterator block will be transformed into a nested stream at 330. As previously mentioned, compilers alter or generate more efficient code than is specified while preserving the desired functionality. With respect to iterator blocks, the compiler generates a state machine for iterating through elements. If the compiler also provides for flattening nested streams, then the generated state machine code should also conform to the conventions provided for nested streams namely employ a NestedMoveNext function and return stream states such as StreamState.Value and StreamState.Done.

Figure 4:
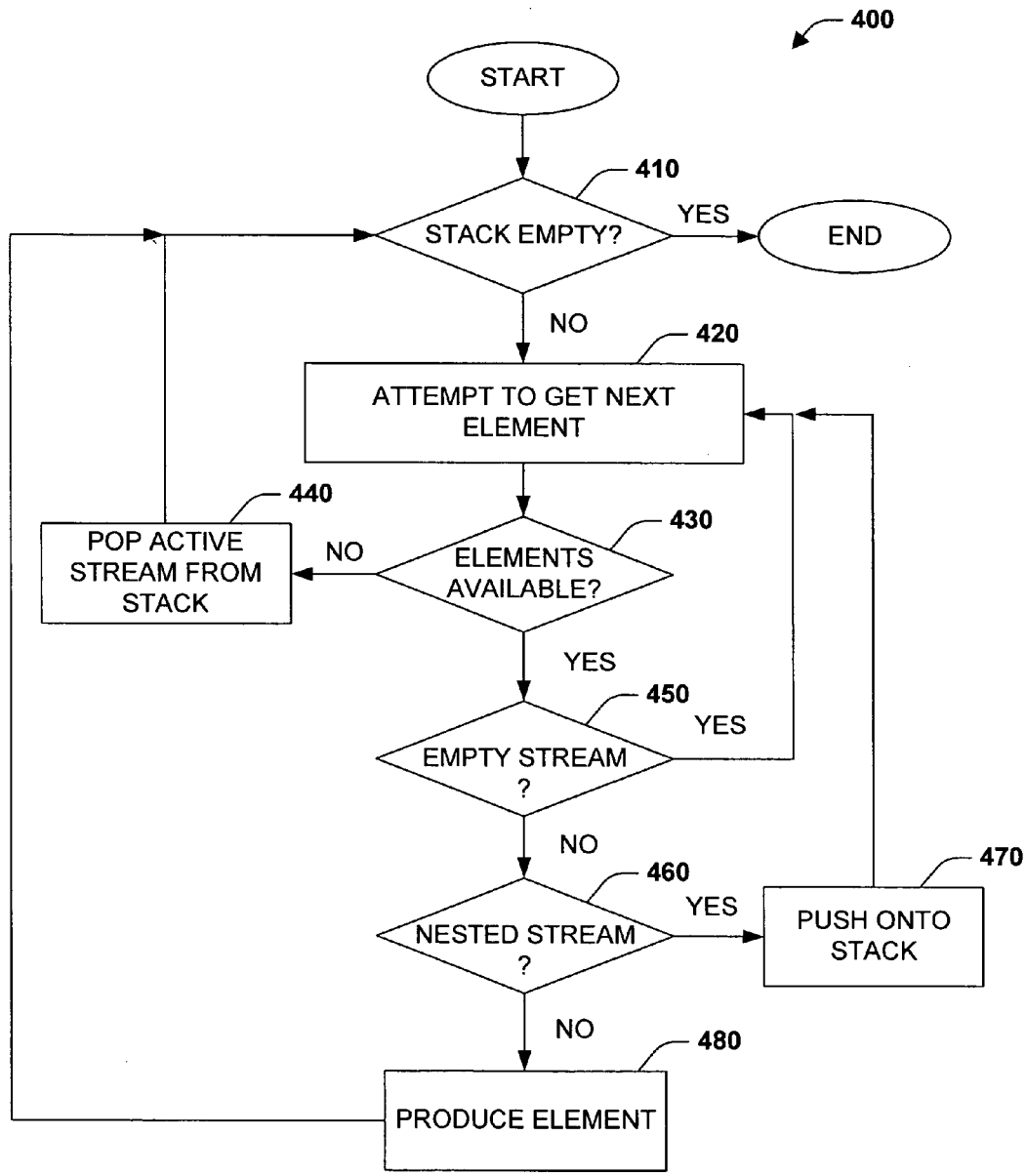
FIG. 4 is a flow chart diagram of a method for processing nested streams in accordance with an aspect of the subject invention.

FIG. 4 depicts a methodology 400 for processing nested streams using a stack in accordance with an aspect of the subject invention. The method 400 provides for yielding every element in a set of nested streams at most once. Each level in the stack includes a stream (or a pointer to a stream), where that stream can itself be a simple stream or nested stream. The methodology treats a stream the same as a stream of streams or a stream of streams of streams, etc. The streams in the stack may be representations of elements in other structures such as trees or even stacks, which may be handled as streams by the nested stream flattening methodology.

The method typically begins with a stream representing the entire set of nested streams on the stack. At 410, a check is made to determine whether the stack is empty. If the stack is empty, the method simply terminates. Otherwise, the method can proceed to 420. At 420, an attempt is made to get the next element in the currently active stream. For example, the first element of the nested stream (((((( ), 1), 2), 3), 4), 5) is the nested stream ((((( ), 1), 2), 3), 4). At 430, a check is made to determine if more elements are available in the currently active stream. If there are no more elements in the currently active stream the tool pops the active stream from the stack at 430 and checks to determine whether the stack is now empty at 410. As used herein, the phrases "pop" and "push" a stream are meant to include operations in which pointers or other references to streams are popped or pushed from a stack structure. In other operations, popping and pushing may involve more than just pointers, for example, individual streams may be pushed onto the stack.

When there is an element of some kind remaining in the active stream, the method checks whether it is an empty stream at 450. If it is an empty stream, then the method proceeds to get the next element in the active stream at 420. Otherwise, the method checks whether the element is itself a nested stream at 460. If so, the method pushes the nested stream on the stack, making the nested stream the currently active stream. Then the method attempts to get the next element in that stream at 420. As described above, the first element of the stream ((((( ), 1), 2), 3), 4), 5) is the nested stream ((((( ), 1), 2), 3), 4). Accordingly, the method would push the stream ((((( ), 1), 2), 3), 4) on the stack to become the active stream at 470. Subsequently the tool pushes the nested streams ((( ), 1), 2), 3), (( ), 1), 2) and (( ), 1) onto the stack before reaching the empty string ( ). If the next element is not an empty stream or a nested stream, the next element is a basic element and the method produces that element at 480. For example, when the active stream is (( ), 1) the empty stream is skipped pursuant to the check at 450 and the next element is 1 can be produced by the method. The method can then check, at 410, whether the stack is empty. At this point, the method reaches the end of the active stream (( ), 1), which means there are no more elements available in the stream. Hence, the stream is popped off the stack at 440. The method can then proceed to the next stream on the stack and produces the next element "2" in the active stream ((((( ), 1), 2), then reaches the end of that stream and pops it off at 440. This can continue until the method produces the last element "5" of the stream ((((( ), 1), 2), 3), 4), 5) and pops that stream off the stack at 440 and determines at 410 that the stack is no empty.

Iterators can be specified in a myriad of different manners and in a variety of different programming languages. For example, in C# a programmer can specify an interator utilizing a few constructs (e.g., yield statements), which the compiler uses to create classes and code implementing the IEnumerable and IEnumerator interfaces for an Enumerator object. For instance, a C# compiler can convert a foreach loop in a call to an instantiation of an Enumerator object and a while loop. In the while loop, a MoveNext method of the Enumerator object is called and for every current object in the collection, the statement in the original foreach loop is executed.

In the class definition that includes the iterator, for example, the programmer includes a GetEnumerator( ) function that returns an IEnumerator<T> and includes yield statements to define an iterator in C#. The compiler creates for the programmer an object that implements the iterator using the IEnumerable and IEnumerator interfaces. Moreover, the compiler generates code for returning an Enumerator object and generates code for the MoveNext method and the Current property of the Enumerator object. The MoveNext method code in particular operates as a state machine that maintains a stack of streams.

Figure 5:
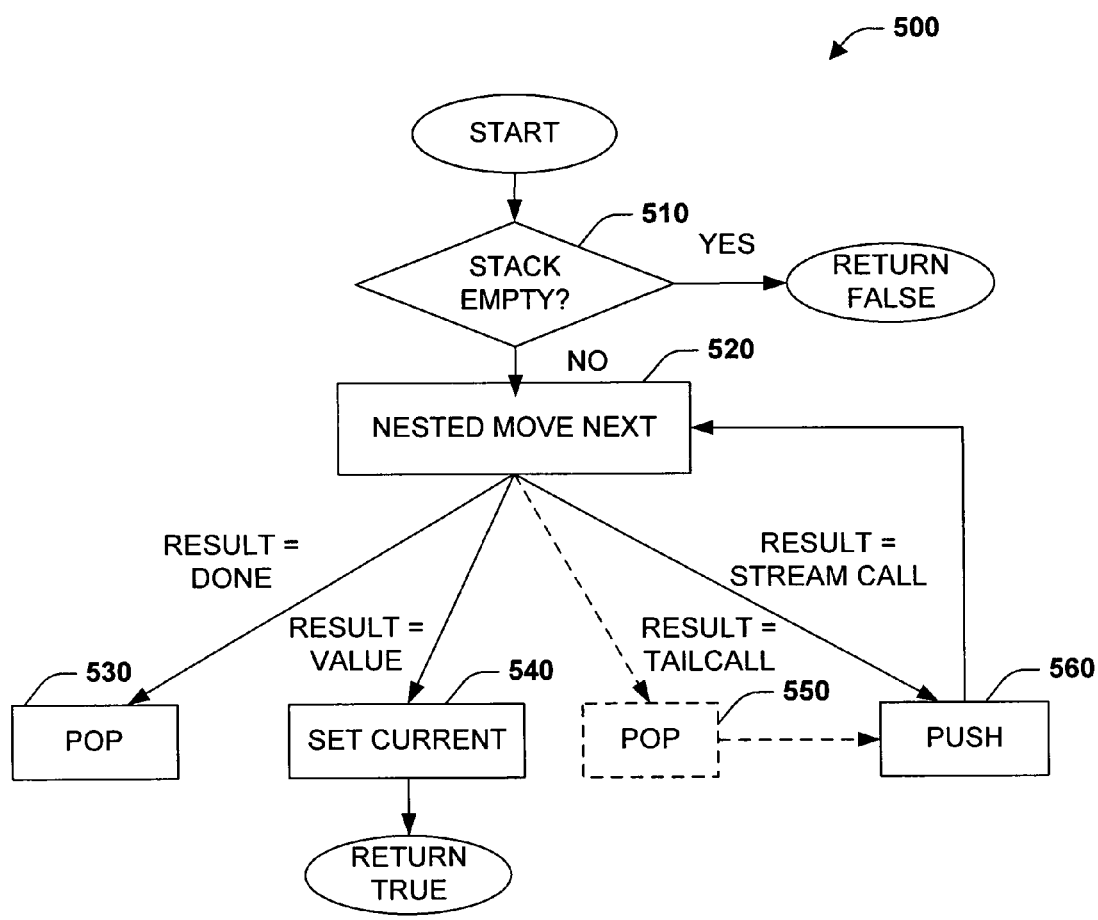
FIG. 5 is a state machine diagram for a MoveNext method in accordance with an aspect of the subject invention.

FIG. 5 illustrates a state machine 500 for processing the MoveNext( ) method of en Enumerator class for an iterator in C#. A stream flatting method or tool as described above includes an Enumerator object that operates as shown n the state machine 500. Alternatively, another tool can include the state machine 500.

As noted supra, the MoveNext( ) method is called in the condition part of a while loop for a caller foreach construct. The MoveNext( ) method returns Boolean values where true indicates there was another element in the nested stream and false indicates that there were no other elements in the nested stream. During MoveNext( ) processing, various side effects update the stack of streams and the Current element in the set of nested streams.

At 510, a check is initially made to determine whether the stack is empty. For example, the Enumerator object maintains a count variable indicating the number of streams pushed on the stack and if the count=0 then the stack is empty. If the stack is empty, the MoveNext method returns false and terminates. Otherwise, at 520 a NestedMoveNext( ) method is executed on the stream currently at the top of the stack. The NestedMoveNext( ) method returns a result that depends on the type of stream elements in the nested streams. As illustrated, the result of the NestedMoveNext( ) call can be (1) an indication that the currently active stream is done or contains no more elements; (2) an indication that the next element is a call to another stream (e.g., nested stream); (3) a value (e.g., basic element); or (4) an indication that the next element is a tail-call to another stream (e.g., a nested stream at the end of the currently active stream). When a programmer introduces a new data type or structure, the programmer may provide an implementation for the NestedMoveNext( ) method to indicate how that type or structure should be handled in nested streams. Moreover, new rules may be added to the compiler to handle the new data type or structure.

If the result of the call to NestedMoveNext( ) indicates that the currently active stream is empty or done, the stream can be popped from the stack at 530. Subsequently, the method can proceed to check whether the stack is empty at 510.

If the result of the NestedMoveNext( ) call indicates that the next element is itself a stream, the stream can be pushed to onto the stack. Then, the method can evaluate the elements pushed to the stack by calling NestedMoveNext( ) on that stream.

If the result of the call to NestedMoveNext( ) indicates that the next element is a value for a basic element, the current property of the enumerator object can be set at 540. The current property is accessed from the while loop for the calling foreach loop construct. It indicates the element currently being iterated over in a collection. Subsequently, true can be returned for the MoveNext( ) method.

Finally, the state machine 500 may include an additional optimization for handling tail-calls. In the context of nested stream processing, a tail-call indicates a nested stream that is itself the last element, or tail stream, of a stream. If the result of the call to NestedMoveNext( ) indicates that the next element is itself a stream that is the last element in a stream, the current stream can be popped from the stack at 550 and the nested stream pushed onto the stack at 560. Alternatively, tail-calls can be handled by pushing the nested stream and popping respective streams when they are later determined to be empty.

Tail calls often provide opportunities for optimization. Generally, stack space is allocated each time something is pushed to the stack. When that thing is popped from the stack, the stack space is de-allocated. Notably, if the last element of a given stream at the top of stack is itself a nested stream, the simple way to process that nested stream is to push it to the top of the stack. The steam right below the top (i.e., the "parent" stream) has no elements left, however, and is just taking up stack space. While this may not seem like much space, it adds up with large stream.

As disclosed by FIGS. 4 and 5, methods are revealed for processing nested streams and nested streams alone. The methods assume that a compiler or programmer provide a steam and implement a NestedMoveNext method associated therewith. In a multi-language environment such as the ISO Common Language Infrastructure, it is important to be able to consume types and functions that are produced by a variety of different compilers. However, even in a single-language environment, such as the Java Virtual Machine, programs need to be able to consume types and classes that are created by older versions of the same compiler or simply created in different ways. Accordingly, the system and method of processing nested streams should be modified to function with non-nested streams or enumerators.

Figure 6:
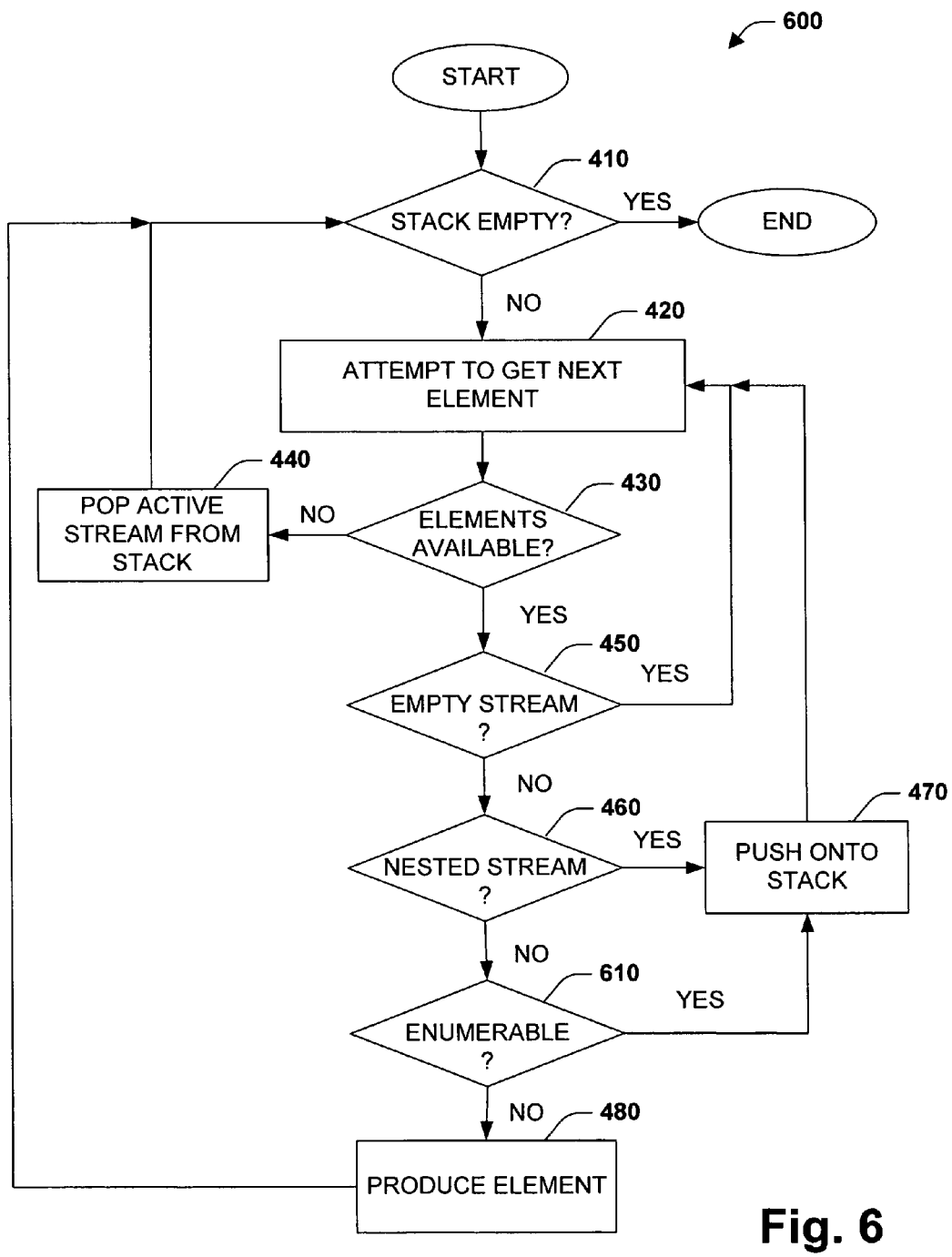
FIG. 6 is a flow chart diagram of a method for processing both nested and non-nested streams in accordance with an aspect of the subject invention.

Turning to FIG. 6, a method 600 is depicted for both processing nested streams and non-nested streams such as conventional enumerators or enumerables in accordance with an aspect of the subject invention. At 410, a determination is made as to whether the stack is empty. If the stack is empty, the method returns false and terminates. If, however, the stack is not empty, then an attempt is made to get the first element, at 420, from the current stream on the stack. A determination is then made as to whether there are more elements available in the currently active stream. If there are not more elements, then at 440, the active stream is popped from the stack and a check is made to determine whether the stack is empty at 410. If there are more elements in the active stream then at a check is made to ascertain whether the element is an empty stream. If the element is an empty stream, then an attempt is made to get the next element in the stream, at 420 (e.g., MoveNext state machine). If the element is not an empty stream, a check is made as to whether it is a nested stream at 460. If it is a nested stream, the active nested stream can be pushed onto the stack at 470. Subsequently, an attempt can be made to retrieve the next element in the active stream at 420. If the element is not a nested stream, a check is made to determine whether it is an enumerable or enumerator at 610. If element is an enumerable or enumerator type, it is pushed to the stack at 470. Thereafter, the next element can be retrieved from the active stream or enumerable. If the element is not an empty stream, a nested stream, or an enumerable or enumerator, then the element should be a basic element. At 480, the element is produced and a check is made at 410 to determine the stack is empty.

It should be appreciated that if an enumerable or enumerator is pushed onto the stack in the previous method iteration amongst the elements contained thereby cannot be accomplished by the same means as is done for nested streams. In particular, the enumerable will not implement the NestedMoveNext( ) method as provided in FIG. 5. Hence, an adapter is necessary.

Figure 7:
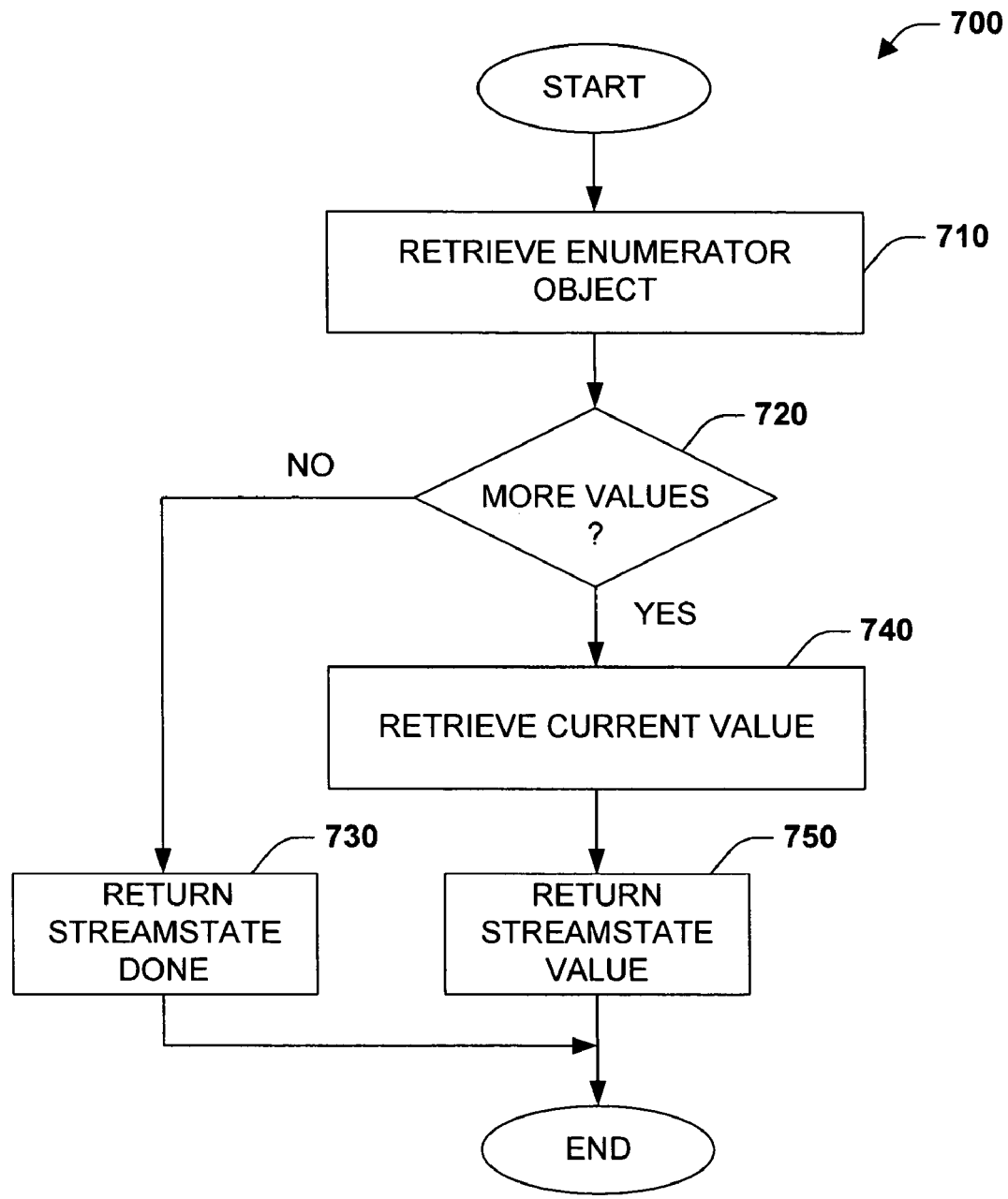
FIG. 7 is a flow chart diagram of an adapter methodology in accordance with an aspect of the subject invention.

FIG. 7 depicts an adapter methodology in accordance with an aspect of the invention. At 710, an enumerator object is received or retrieved. At 720, a determination is made concerning whether there are more values or elements to be retrieved from the enumerator object and set as the current value. If there are not more values to be viewed or retrieved, then at 730 StreamState.Done can be returned and the method terminated. If there are more values or elements to be viewed, then at 740 the value or element is retrieved. Subsequently, at 750 StreamState.Value can be returned and the method terminated. By way of example, if there was an IEnumerable <int> where the enumerable comprises (1, 2). At 710, this enumerator object or a pointer thereto is received or retrieved. At 720, the determination would reveal that there are more values over which to iterate. Then, the value "1" will be retrieved and set to the current value. Thereafter, StreamState.Value will be returned. A subsequent execution would retrieve and set the current value to "2" and return StreamState.Value. Subsequently, the determination at 720 will indicate that there are no more values to view and thus StreamState.Done will be retuned and the method terminated.

Figure 8:
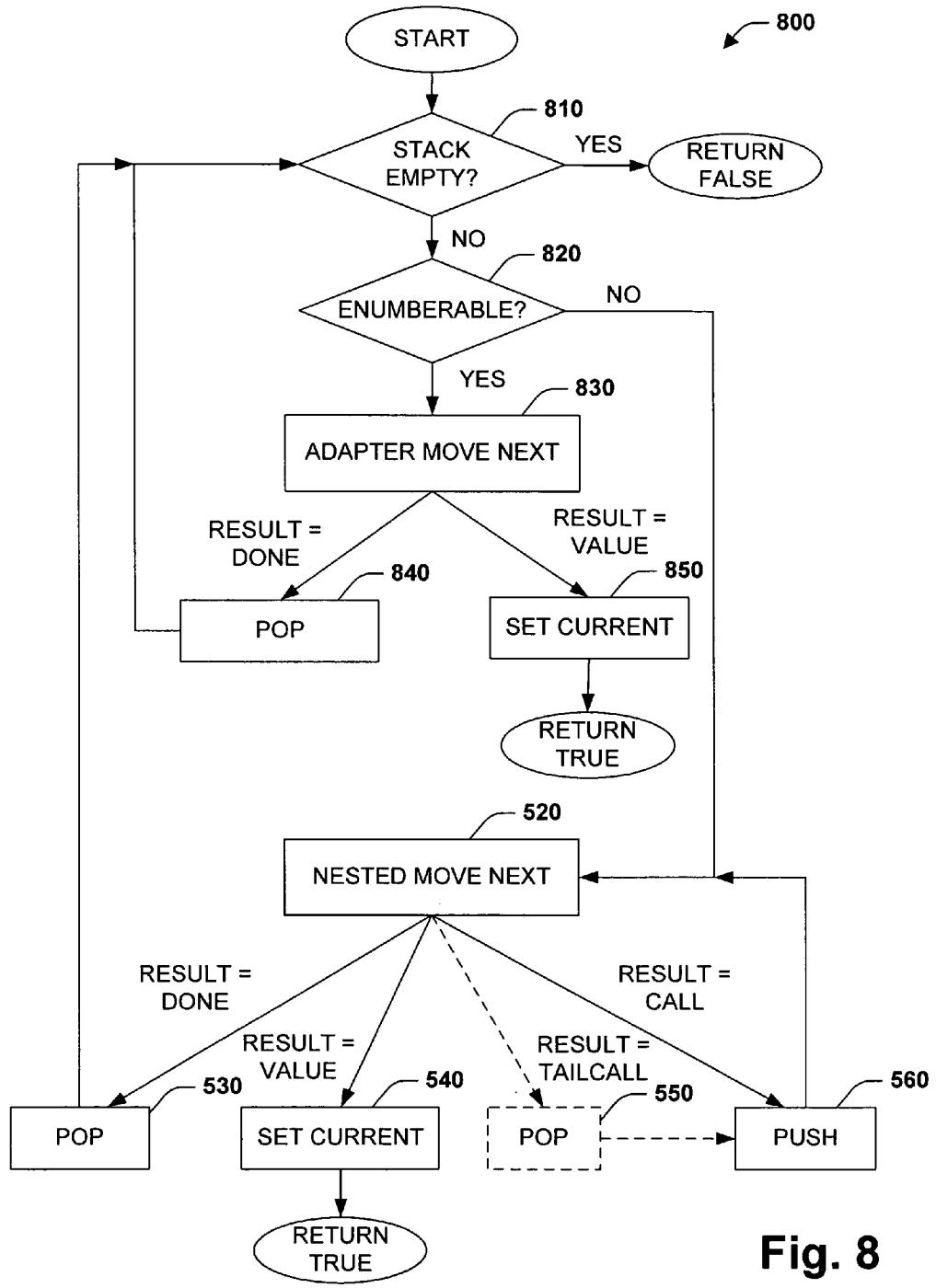
FIG. 8 is a flow chart diagram of a method for retrieving the next element in a collection in accordance with an aspect of the subject invention.

FIG. 8 illustrates a state diagram or methodology for retrieving the next element in accordance with an aspect of the subject invention. At 810, a check is made to determine if the stack is empty. If the stack is empty, false is returned and the method is terminated. If the stack is not empty, at 820 a determination is made as to whether the collection of elements is an enumerable. If it is an enumerable, then the adapter MoveNext can be employed to iterate amongst the elements provided thereby at 830. If the result of the adapter MoveNext( ) function is of state done, then the active stream can be popped at 840 from the stack. If the result of the adapter MoveNext( ) function is of state value, then the current value is set at 850. Thereafter, true can be retrieved to indicate that the iteration retrieved or observed a value, and then the method can terminate. If at 820, the collection is not an enumerable (e.g., it is a nested stream) then processing can proceed by executed the NestedMoveNext( ) method to iterate amongst streams. If the result of the call to NestedMoveNext( ) is done, then the active stream can be popped from the stack at 530. Then, a check can be made to determine whether the stack is empty at 810. If the result of the call is a value state, then at 540 the current value is set, true is returned to indicate that a value was retrieved, and the method is terminated. If the result of the call to NestedMoveNext( ) is another nested stream call, then that stream is pushed onto the stack at 560 and the NestedMoveNext( ) method is executed on the new active stream. If the call result is a tail-call state then at 550 the current stream is popped from the stack at 550 and the pushing the nested tail stream to the stack at 560. Thereafter, the NestedMoveNext( ) method can be executed on the tail stream at 520. Alternatively, the method could simply push the nested tail stream to the stack at 560 and thereafter popping the respective streams when they are later determined to be empty.

Figure 9:
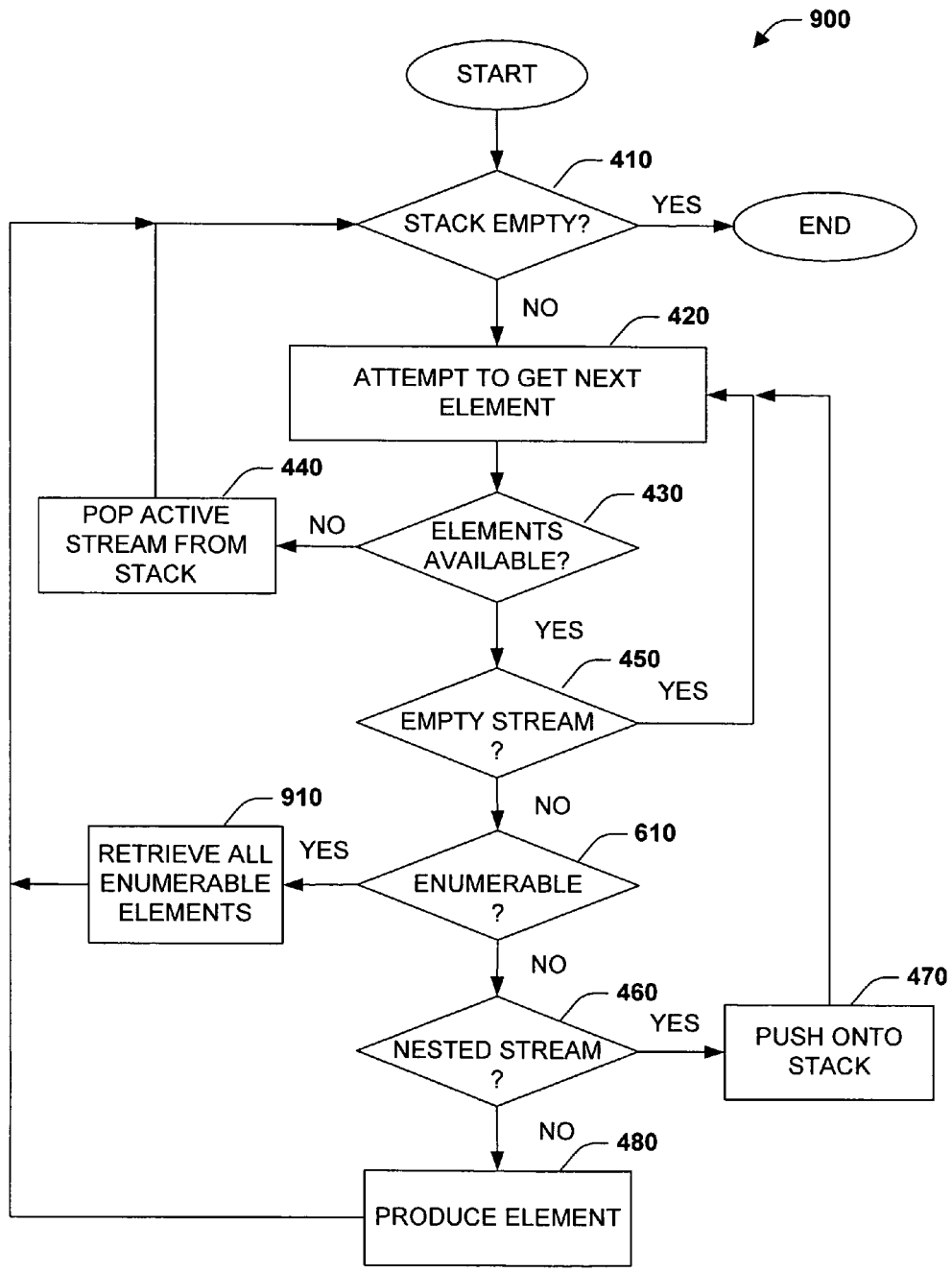
FIG. 9 is a flow chart diagram of a method for processing both nested and non-nested streams in accordance with an aspect of the subject invention.

Turning to FIG. 9 a method 900 for processing both nested streams and non-nested streams such as enumerables is illustrated in accordance with an aspect of the subject invention. At 410, the stack is checked to determine if it is empty. If it is empty, the method simply terminates. Otherwise, an attempt is made, at 420, to get the next element from the collection of elements on the stack. At 430, a check is made to ascertain whether there are any more elements available in the currently active collection. If there are no more elements to process in the current collection then the method proceeds to 440 where the active stream is popped from the stack. Subsequently, a check is made at 410 to determine if the stack is empty. If there is some kind of remaining elements in the active collection or stream as determined at 430, then the method checks whether the element is an empty stream at 450. If it is an empty stream then the method continues at 420 where another element is attempted to be retrieved from the active collection. If the element is not an empty stream, then a check is made to determine if it is an enumerable, at 610. If it is an enumerable, then all the elements are pulled from the enumerable collection one at a time at 910. Thereafter, a check is made as to whether the stack is empty at 410. Alternatively, after all elements are pulled from the enumerable at 910, the collection can be popped from the stack at 440. If the collection is not an enumerable, then at 460 a check is made to determine if it is a nested stream. If it is a nested stream then that stream is pushed to the stack at 470 and the method proceeds to attempt to retrieve an element from the new active stream at 420. If the element is not a nested stream (or anything else as previously checked) then by default it is a basic element. At 480, the basic element is produced and at 410, the stack is check to determine if it is empty. If the stack is empty, then the method simply terminates. If the stack is not, the method can again proceed to 420 where an attempt is made to get the next element. The method continues until all elements are processed or viewed.

Figure 10:
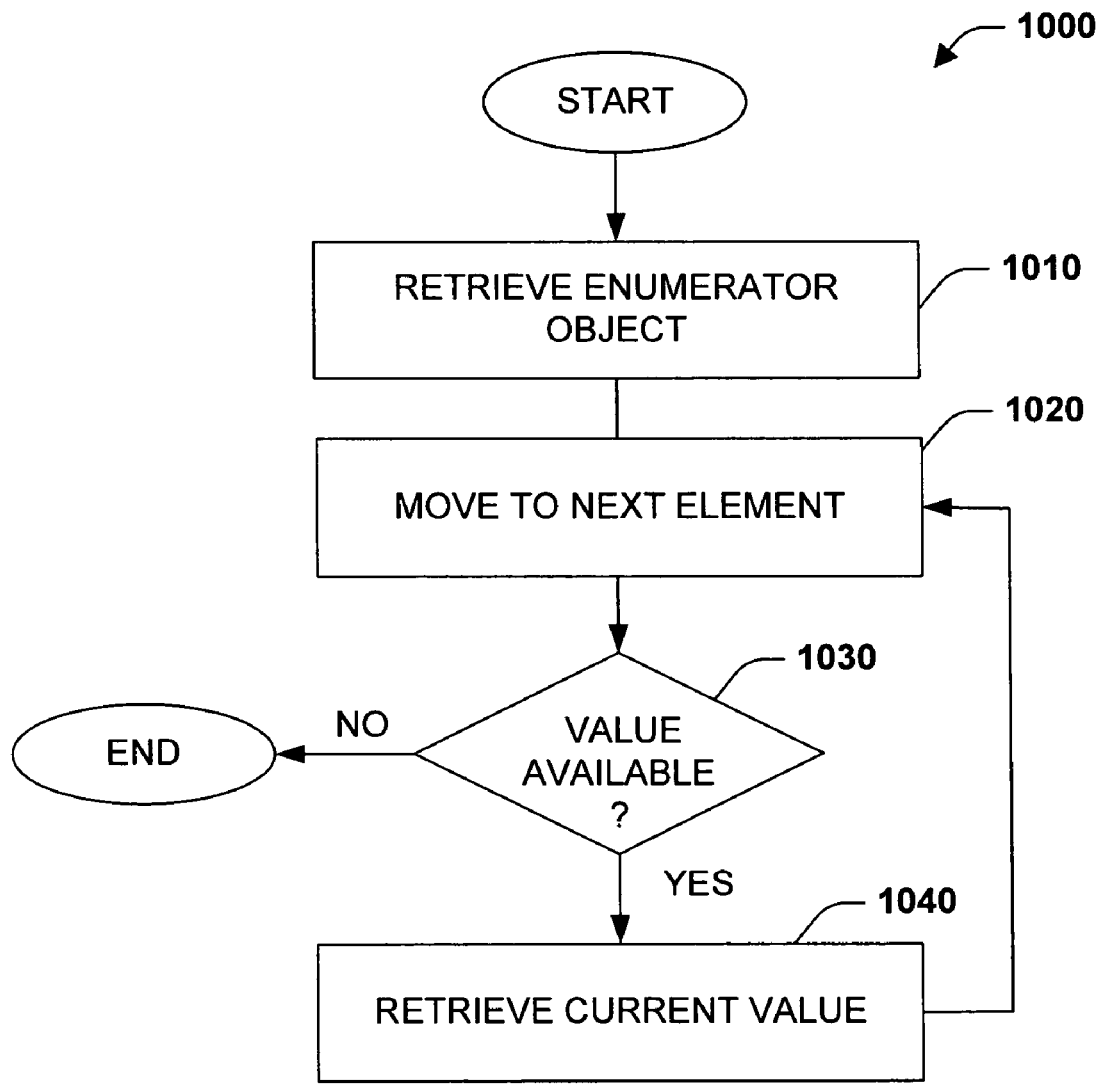
FIG. 10 is a flow chart diagram of a method for retrieving all enumerable elements in accordance with an aspect of the subject invention.

FIG. 10 illustrates a method 1000 for retrieving all enumerator elements in accordance with an aspect of the invention. At 1010, an enumerator object is received or accessed (e.g., via pointer). At 1020, an attempt is made to move to the next element in the collection. On the first pass, this will advance the pointer, for instance, to the first element in the collection. Subsequent calls will advance the pointer or index to the next element in the collection. At 1030, a determination is made as to whether a value is available. This can be indicated by receiving an indication of such from a MoveNext( ) method. If it is available, then the value is retrieved and set to the current value at 1040. Thereafter, an attempt is made to move to the next element in the collection at 1020 and a check is made concerning whether an element is available. Once all elements are consumed and there are no more values available as indicated at 1030. The method can simply terminate.

Figure 11:
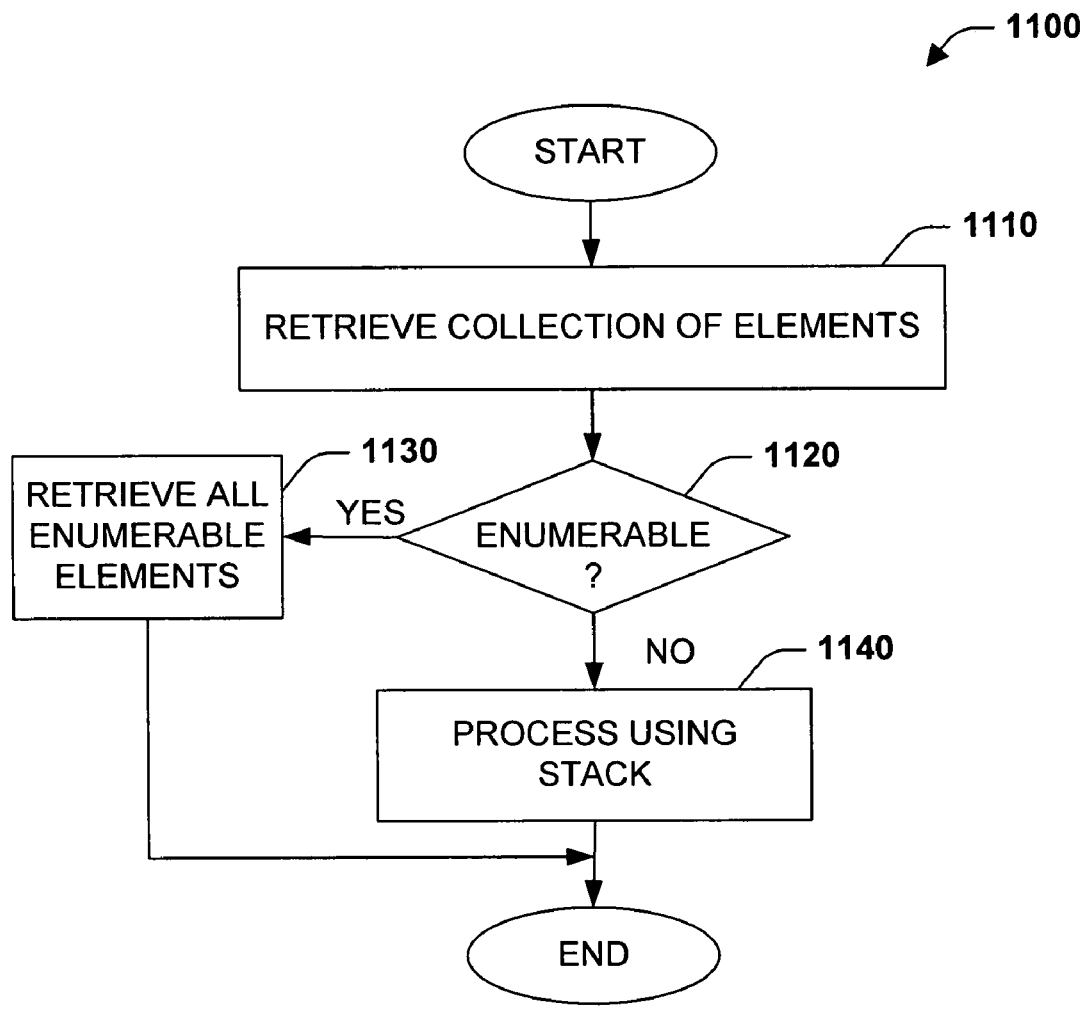
FIG. 11 is a flow chart diagram of a method for processing nested and non-nested streams in accordance with an aspect of the subject invention.

Turning to FIG. 11 a method 1100 for processing non-nested enumerators and nested streams is illustrated in accordance with an aspect of the invention. At 1110, a collection of elements is retrieved or received. At 1120, a determination is made as to whether the collection is an enumerable collection. If it is, the all the enumerable elements can be accessed, for example utilizing method 1000 (FIG. 10). If it is not an enumerable collection, then at 1130 the collection can be processed utilizing the stack as previously described. This description assumes that if the collection is not of type enumerable than it is a nested stream. In this instance, a stack will not be allocated to deal with enumerables, it will only be employed with respect to nested streams. Furthermore, if the stream is not nested then the stack may not need to be allocated as the stream values can just be pulled one by one (e.g., using NestedMoveNext( ) or StreamMoveNext( )). Accordingly, both enumerators and streams can be made more efficient, by only allocating or instantiating a stack for processing of nested streams.

Figure 12:
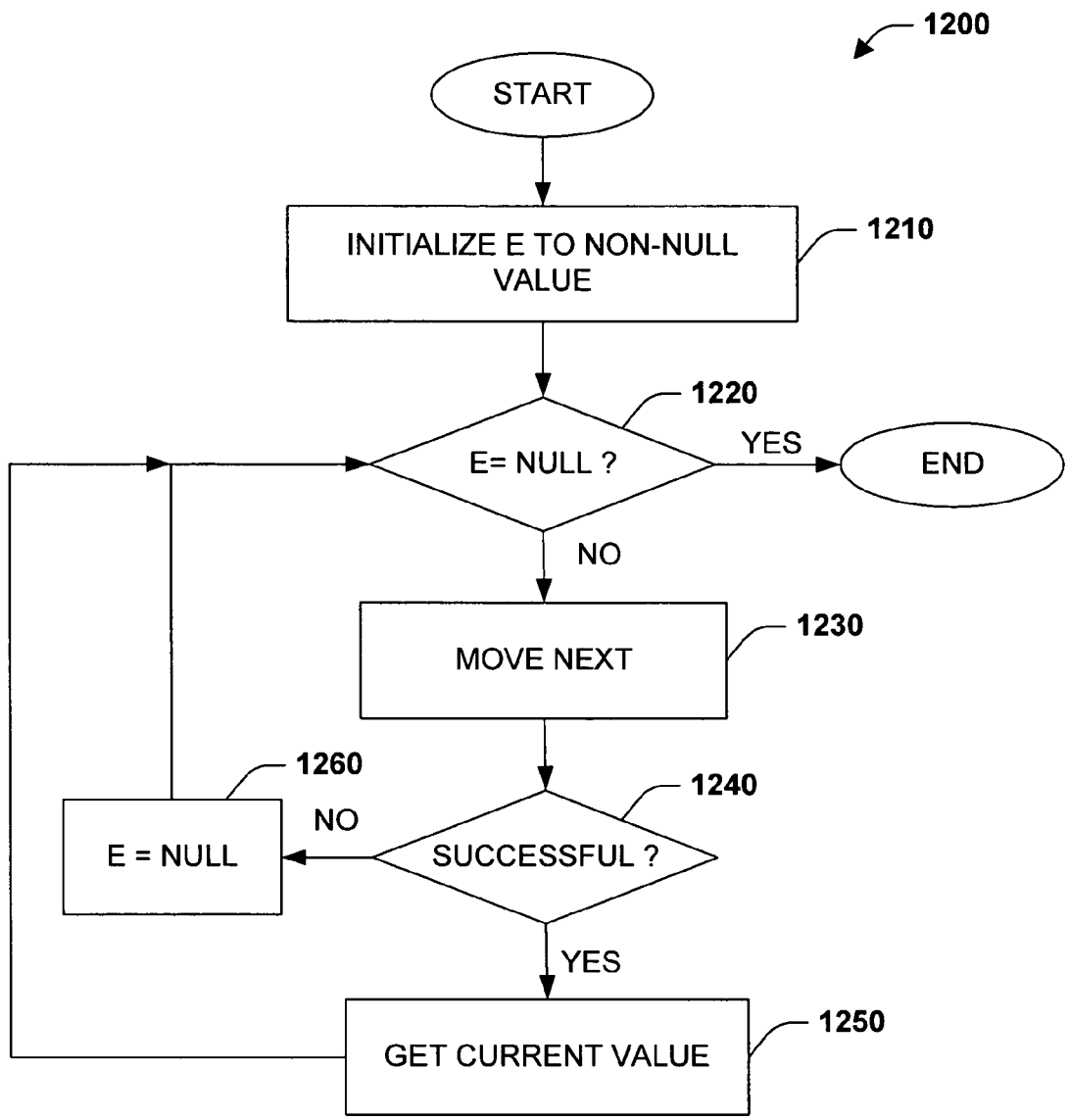
FIG. 12 is a flow chart diagram of a method for iterating through an enumerable collection in accordance with an aspect of the subject invention.

FIG. 12 illustrates a method 1200 of retrieving enumerable elements in accordance with an aspect of the subject invention. At 1210, E is initialized to a non-null value. This can happen upon determining that a collection is of type enumerable. A check is then performed at 1220 to ascertain whether E is equal to null. If it is, the method terminates. Otherwise, the method continues at 1230 where a MoveNext is performed to move the index or pointer to the next element in the collection. The first pass through, this would move the pointer to the first element of the collection. A determination is made as to whether this action was successful at 1240. If it was successful, then the current value is retrieved at 1250. Subsequently, a check is made again at 1220 to determine if E is equal to null. If the MoveNext was not successful, for example if all elements have been examined, then at 1260 the E is set to null. A check is then made at 1220, which determined the value of E is null and the process terminates. The following provides an exemplary code snippet for executing the subject method:

```
public bool MoveNext( ) {
    while(true) {
        if (e != null) {
            if (e.MoveNext( )) {
                ne.currentValue = e.Current;
                return true;
            }
```

```
            e = null;
    }
    StreamState result = ne.NestedMoveNext( );
        switch (result) {
            case StreamState.Value:
                return true;
            case StreamState.Enumerable:
                e = ne.currentEnumerable.GetEnumerator( );
                break;
            case StreamState.Stream:
                if (stack == null)
                    stack = new Stack( );
                stack.Push(ne);
                ne = ne.currentStream;
                break;
            case StreamState.TailStream:
                ne = ne.currentStream;
                break;
            case StreamState.Done:
                if (stack != null && stack.Count > 0) {
                    ne = stack.Peek( ) as Stream;
                    stack.Pop( );
                }
                else {
                    return false;
                }
                break;
        }
    }
}
```

Figure 13:
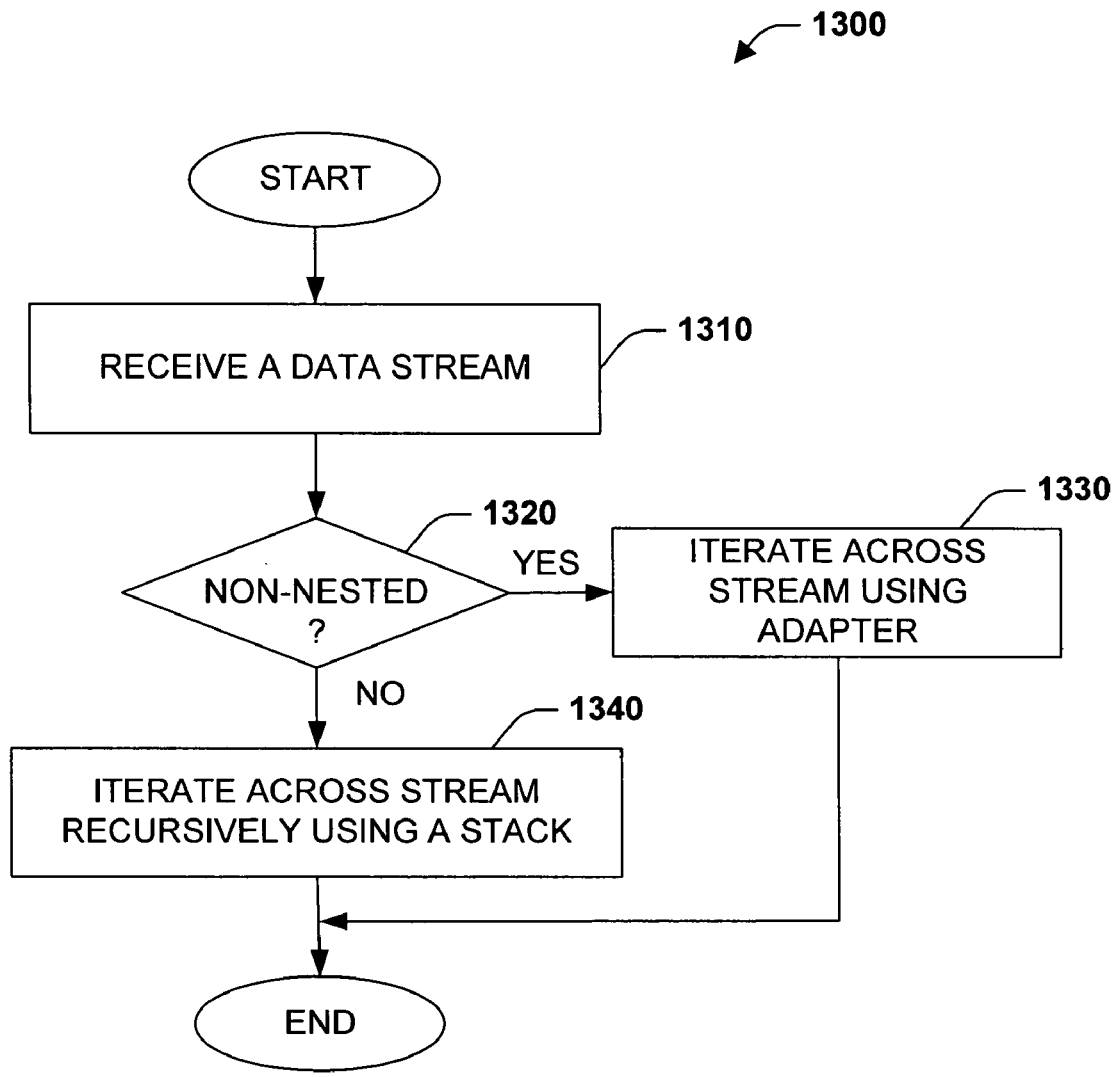
FIG. 13 is a flow chart diagram of a method for traversing streams in accordance with an aspect of the present invention.

Turning to FIG. 13, a method 1300 for traversing streams is illustrated in accordance with an aspect of the subject invention. Method 1300 provides for selective execution of a streams based on their type. At 1310, a data stream is received or retrieved. The stream includes a sequence of one or more elements. The stream can be either a conventional non-nested stream such as an enumerable or a nested stream. At 1320, the type of stream is determined. This can be ascertained by analyzing the specified type. For example, a stream specified as an enumerable or as implementing IEnumerable can be a conventional non-nested stream, whereas a stream of type stream can be a nested stream. If the stream is a conventional non-nested stream then the method can continue at 1330. At 1330, the stream can be iterated across utilizing an adapter. The adapter can provide methods utilized to traverse the conventional non-nested stream (e.g., MoveNext( ), Current . . . ). Furthermore, the adapter can provide state output in accordance with nested stream standards (e.g., StreamState.Value, StreamState.Done . . . ). If the stream is determined to be a nested stream at 1320, then at 1340 iteration across the stream can be accomplished recursively utilizing a stack. In brief, the stream can be pushed to the stack, making it the active stream. Subsequently, an attempt can be made to retrieve an element from the active stream. This can be accomplished by executed a NestedMoveNext( ) which identifies elements sequentially when called. If the element is another stream (i.e., a nested stream) then this stream can be pushed to the top of the stack and an element can be attempted to be retrieved from the stream. If the element is an empty set, it can simply be ignored and the next element retrieved. If it element is a basic element, then it can be produced and the next element retrieved. Once all elements in an active stream are consumed or viewed once, the stream is popped from the stack and the process continues with the next stream until the stack is empty.

Figure 14:
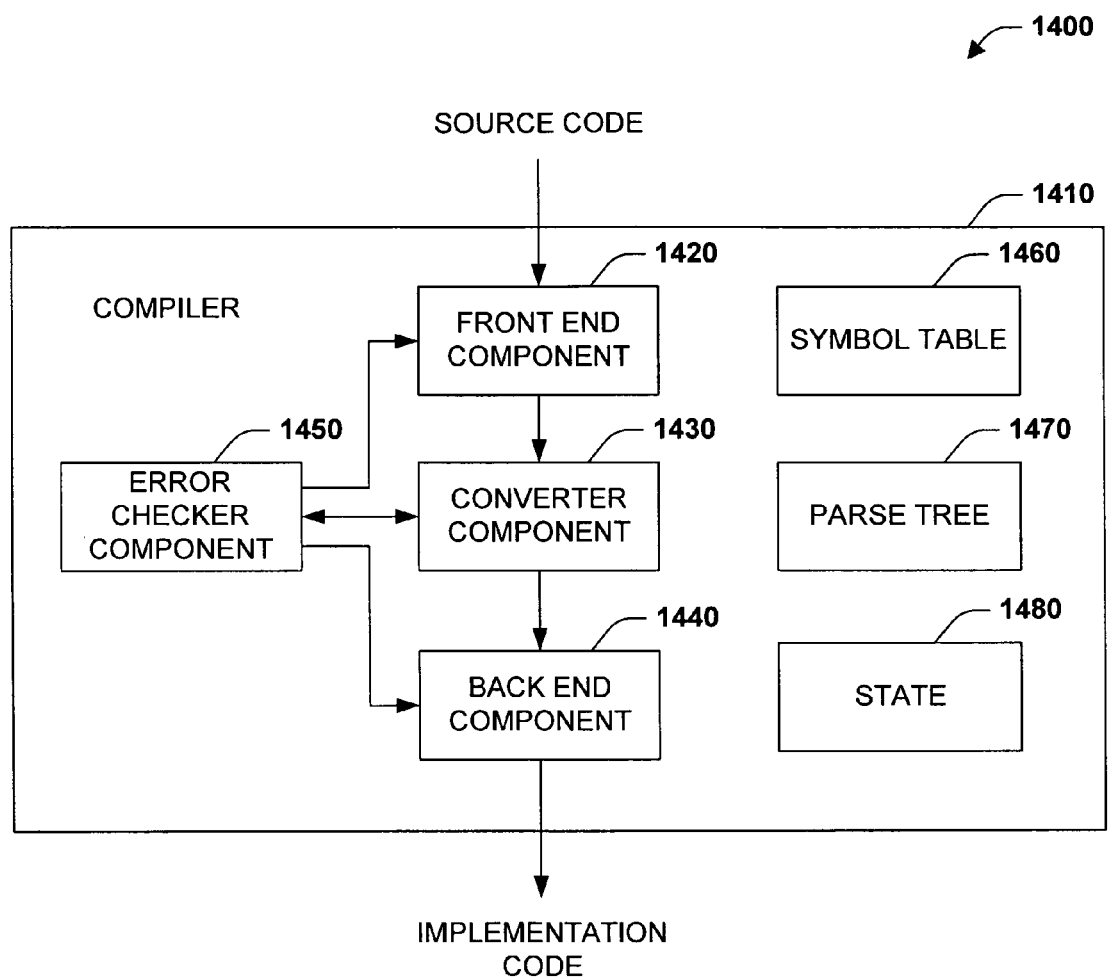
FIG. 14 is a schematic block diagram of a sample compiler environment within which aspects of the invention can be incorporated.

FIG. 14 is a block diagram depicting a compiler environment 1400 that can be utilized to produce implementation code for, inter alia, state machines to facilitate iteration through enumerable and stream sequences and flattening of nested streams from provided source code. The compiler environment 1400 includes a compiler 1410 including front-end component 1420, converter component 1430, back-end component 1440, error checker component 1450, symbol table 1460, parse tree 1470, and state 1480. The compiler 1410 accepts source code as input and produces implementation code as output. The input can include but is not limited to code associated with generators such as iterators and nested stream processing. The relationships amongst the components and modules of the compiler environment illustrated the main flow of data. Other components and relationships are not illustrated for the sake of clarity and simplicity. Depending on implementation, components can be added, omitted, split into multiple modules, combined with other modules and/or other configurations of modules.

Compiler 1410 can accept as input a file having source code associated with processing of a sequence of elements in the form of an enumerable, enumerator, stream, or nested stream. The source code may include code defining a collection of elements and methods for traversing such elements. Compiler 1410 may process source code in conjunction with one or more components for analyzing constructs and generating or injecting code.

A front-end component 1420 reads and performs lexical analysis upon the source code. In essence, the front-end component 1420 reads and translates a sequence of characters (e.g., alphanumeric) in the source code into syntactic elements or "tokens", indicating constants, identifiers, operator symbols, keywords, and punctuation among other things.

Converter component 1430 parses the tokens into an intermediate representation. For instance, the converter component 1430 can check syntax and group tokens into expressions or other syntactic structures, which in turn coalesce into statement trees. Conceptually, these trees form a parse tree 1470. Furthermore and as appropriate, the converter module 1430 can place entries into a symbol table 730 that lists symbol names and type information used in the source code along with related characteristics.

A state 1480 can be employed to track the progress of the compiler 1410 in processing the received or retrieved source code and forming the parse tree 1470. For example, different state values indicate that the compiler 1410 is at the start of a class definition or functions, has just declared a class member, or has completed an expression. As the compiler progresses, it continually updates the state 1480. The compiler 1410 may partially or fully expose the state 1480 to an outside entity, which can then provide input to the compiler 1410.

Based upon constructs or other signals in the source code (or if the opportunity is otherwise recognized), the converter component 1430 or another component can inject code for implementing fast stream flattening alone or in combination with enumeration of non-nested streams or enumerables, among other things. Rules coded into the converter component 1430 or other component indicates what must be done to implement the desired functionality and identify locations where the code is to be injected or where other operations are to be carried out. "Injected code" typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

In the case of a C# compiler processing code for an iterator, the converter component 1430 or other module conventionally injects code for implementing the IEnumerable and IEnumerator interfaces of an enumerator object for the iterator. For instance the compiler can inject MoveNext( ) method code for the enumerator object for processing with a collection of elements. According to an aspect of the subject invention, the compiler can implement adaptive code to facilitate processing of both conventional non-nested enumerable and stream type collections. For instance, assume a programmer specifies the following source code:

```
IEnumerable<int> MyList(int i) {
    yield return i;
    while (i-- > 0)
    {
        yield foreach MyList(i);
    }
}
```

The above code fragment can then be compiled to a Nested-MoveNext implementation, as shown below, to enable compatibility with a system employing nested streams.

```
Stream<int> NestedMoveNext( ) {
    switch (_state) {
        case 0:
            _current = i;
            _state = 1;
            return StreamState.Value;
        case 1:
            while (i--> 0)
            {
                _current = null;
                _currentStream = MyList(i);
                return StreamState.Stream;
            }
            _state = 2;
            break;
        default:
            _currentStream = null;
            return StreamState.Done;
    }
}
```

Based on the symbol table 1460 and the parse tree 1470, a back-end component 1440 can translate the intermediate representation into output code. The back-end component 1440 converts the intermediate representation into instructions executable in or by a target processor, into memory allocations for variables, and so forth. The output code can be executable by a real processor, but the invention also contemplates output code that is executable by a virtual processor.

Furthermore, the front-end component 1420 and the back end component 1440 can perform additional functions, such as code optimization, and can perform the described operations as a single phase or in multiple phases. Various other aspects of the components of compiler 1410 are conventional in nature and can be substituted with components performing equivalent functions. Additionally, at various during processing of the source code, an error checker component 1450 can check for errors such as errors in lexical structure, syntax errors, and even semantic errors. Upon detection error, checker component can halt compilation and generate a message indicative of the error.

Figure 15:
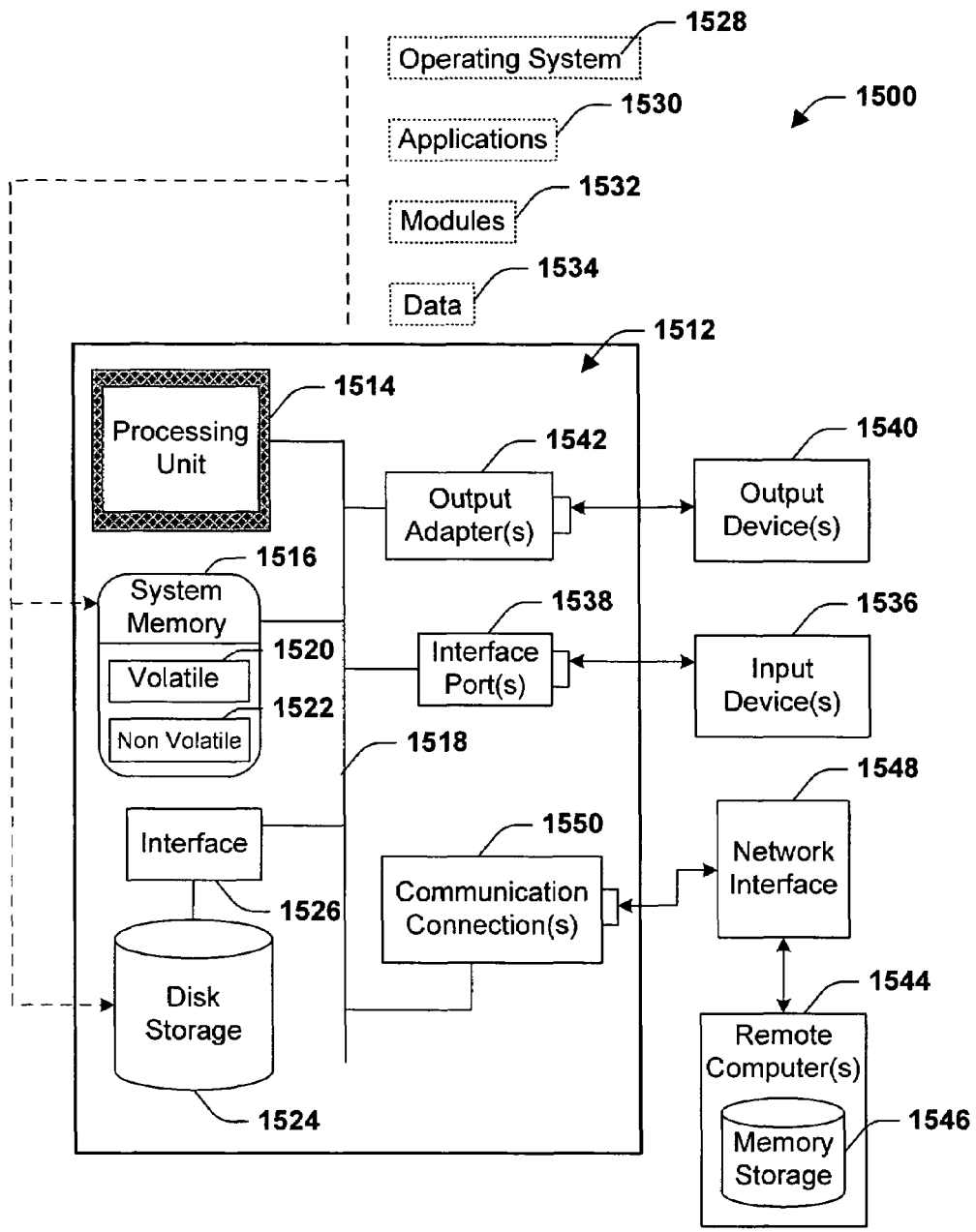
FIG. 15 is a schematic block diagram illustrating a suitable operating environment in accordance with an aspect of the present invention.

In order to provide a context for the various aspects of the invention, FIG. 15 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 15, an exemplary environment 1510 for implementing various aspects of the invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/non-removable, volatile/non-volatile computer storage media. FIG. 15 illustrates, for example disk storage 1524. Disk storage 4124 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the present invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512 and to output information from computer 1512 to an output device 1540. Output adapter 1542 is provided to illustrate that there are some output devices 1540 like displays (e.g., flat panel and CRT), speakers, and printers, among other output devices 1540 that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems, power modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A generator compilation system, the system that includes a processor and a computer-readable-storage-medium storing the following components that are executable by the processor:

a receiver component that receives a stream, wherein the stream includes a sequence of one or more elements;

a type component that determines whether the stream is nested or non-nested by identifying a type of the stream, wherein the stream is non-nested when the type is enumerable, and the stream is nested when the type is stream;

an adapter component that enables iteration across the non-nested stream when the stream is determined to be a non-nested stream to produce a state output in accordance with nested stream states, the iteration across the non-nested stream comprising:

retrieving an element from the non-nested stream, returning a state value indicating the element is available, producing the element, moving an index to a next element, and terminating the iteration when a return state indicating that all elements in the non-nested stream have been seen and produced;

an enumeration component that enables iteration across the nested stream when the stream is determined to be a nested stream by recursively using a stack to produce a flattened stream that enumerates one or more elements, the iteration across the nested stream comprising:

pushing the nested stream onto the stack, and making the nested stream as an active stream in the stack;

retrieving all the elements in the active stream from the stack, the retrieving all the elements in the active stream comprising:

determining whether the retrieved element is a base element or a stream, pushing the received element onto the top of the stack when the retrieved element is a stream, and producing the retrieved element in the flattened stream when the retrieved element is a base element, popping the active stream from the stack when all elements in the active stream are consumed; and a state component that generates a state machine to facilitate efficient iteration through the nested stream by optimizing one or more tail-calls, the optimizing comprising popping a parent stream from the stack when the one or more tail-calls occur, wherein the one or more tail-calls indicating last element of the active stream is a nested stream.

2. The system of claim 1, wherein the adapter component returns a stream state.

3. The system of claim 2, wherein the stream state is set to value to indicate that the adapter component has successfully moved to the next element or value in the collection.

4. The system of claim 3, wherein the stream state is set to done to indicate that the adapter component has successfully iterated through all the elements in the collection.

5. The system of claim 1, wherein the state machine includes at least four states including value, stream, enumerable, and done.

6. The system of claim 5, wherein the state machine is implemented via a programmatic switch statement.

7. A method of efficient stream enumeration comprising:
receiving a stream, wherein the stream includes a sequence of one or more elements;
determining whether the stream is nested or non-nested, the determination comprising retrieving a stream type, wherein the stream is non-nested when the type is enumerable, and the stream is nested when the type is stream;
when the stream is determined to be a non-nested stream, iterating across the non-nested stream utilizing an adapter that produces a state output in accordance with nested stream states, the iteration across the non-nested stream comprising:
retrieving an element from the non-nested stream,
returning a state value indicating that the element is available,
producing the element,
moving an index to a next element, and
terminating the iteration when a return state indicating that all elements in the non-nested stream have been seen and produced;
when the stream is determined to be a nested stream, iterating across the nested stream recursively using a stack to produce a flattened stream that enumerates one or more elements, the iteration across the nested stream comprising:
pushing the nested stream onto the stack, and making the nested stream as an active stream in the stack;
retrieving all the elements in the active stream from the stack, the retrieving all the elements in the active stream comprising:
determining whether the retrieved element is a base element or a stream,
pushing the received element onto the top of the stack when the retrieved element is a stream, and
producing the retrieved element in the flattened stream when the retrieved element is a base element,
popping the active stream from the stack when all elements in the active stream are consumed; and
optimizing one or more tail-calls, the optimizing comprising popping a parent stream from the stack when the one or more tail-calls occurs, wherein the one or more tail-calls indicating last element of the active stream is a nested stream;
wherein instructions associated with one or more of the above steps are executed on a processor operatively coupled to memory.

8. The method of claim 7, further comprising retrieving the next element from the stream after pushing the stream to the stack or producing an element.

9. A computer readable medium having stored thereon computer executable instructions for carrying out the method of claim 7.

10. A storage medium storing instructions that, when executed implement a method comprising:
receiving a stream, wherein the stream includes a sequence of one or more elements;
determining whether the stream is nested or non-nested, the determination of whether the stream is nested or non-nested comprising retrieving a type of stream which indicating the stream is non-nested when the type is enumerable, and the stream is nested when the type is stream;
when the stream is determined to be a non-nested stream, iterating across the non-nested stream utilizing an adapter that produces a state output in accordance with nested stream states, the iteration across the non-nested stream comprising:
retrieving an element from the non-nested stream,
returning a state value indicating that the element is available,
producing the element,
moving an index to a next element, and
terminating the iteration when a return state indicating that all elements in the non-nested stream have been seen and produced;
when the stream is determined to be a nested stream, executing a state machine including iterating across the nested stream recursively using a stack to produce a flattened stream that enumerates one or more elements, the iteration across the nested stream comprising:
pushing the nested stream onto the stack, and making the nested stream as an active stream in the stack;
retrieving all the elements in the active stream from the stack, the retrieving all the elements in the active stream comprising:
determining whether the retrieved element is a base element or a stream,
pushing the received element onto the top of the stack when the retrieved element is a stream, and
producing the retrieved element in the flattened stream when the retrieved element is a base element,
popping the active stream from the stack when all elements in the active stream are consumed; and
optimizing one or more tail-calls, the optimizing comprising popping a parent stream from the stack when the one or more tail-calls occur, wherein the one or more tail-calls indicating last element of the active stream is a nested stream;
wherein instructions associated with one or more of the above steps are executed on a processor operatively coupled to memory.

11. The method of claim 10, executing the state machine further comprising popping nested streams from the stack upon reviewing all elements and continuing iterating until the stack is empty.

12. The method of claim 10, wherein retrieving all elements consecutively comprises executing a MoveNext method that moves to the next element and produces the current element until all elements are produced.

* * * * *